United States Patent Office
2,977,378
Patented Mar. 28, 1961

2,977,378

COMPLEX COMPOUNDS OF TETRAISOPROPYL ZIRCONATE WITH AMMONIA

Andrew A. Kasper, Watertown, Mass., assignor to The Kendall Company, Boston, Mass., a corporation of Massachusetts No Drawing. Filed Oct. 23, 1958, Ser. No. 769,099

4 Claims. (Cl. 260—429.3)

This invention relates to complexes of tetraisopropyl zirconate and ammonia and pertains more specifically to such complexes containing up to two moles of ammonia per mole of zirconate.

Tetraisopropyl zirconate, as is well known, is useful as a catalyst for ester-interchange reactions and is also customarily employed as the starting material in the preparation of other tetraalkyl zirconates. The tetraisopropyl zirconate is commonly prepared by reacting zirconium tetrachloride with isopropyl alcohol, then introducing anhydrous ammonia to neutralize the liberated hydrochloric acid, ammonium chloride being precipitated and removed by filtration. The desired product is obtained by distilling the reaction mixture after removal of the ammonium chloride, but the procedure leads to very poor yields, the product amounting to only 10% to 15% of the theoretical yield. The product is extremely susceptible to hydrolysis, appreciable decomposition occurring as soon as it is exposed to the atmosphere.

It has been proposed to employ, instead of tetraisopropyl zirconate, the complex of this compound with one molecule of tetraisopropyl alcohol, and it has been found that such a complex can be obtained in a yield of approximately 50% to 60% of the theoretical when the above-described reaction is carried out in the presence of excess alcohol. However, the alcohol complex is also extremely susceptible to hydrolysis and begins to decompose when exposed to the atmosphere for as little as a fraction of a minute. Accordingly, the complex, like the tetraisopropyl zirconate, is extremely difficult to handle; special precautions are required to carry out even such simple operations as weighing the material.

It has now been found that there exist complexes of tetraisopropyl zirconate with ammonia, which can be termed "ammoniates," and that these complexes make it possible to obtain very high yields of tetraisopropyl zirconate from zirconium tetrachloride. The tetraisopropyl zirconate may readily be separated from the ammonia complex in pure form by simply heating at reduced pressure at a temperature of 100°–120° C., the amount of tetraisopropyl zirconate obtained by this procedure amounting to upwards of 70% of the theoretical amount based on the amount of zirconium tetrachloride starting material and over 97% of the theoretical based on the ammonia complex.

While one of the complexes of the present invention containing two moles of ammonia for each mole of zirconate (a "diammoniate") is obtainable in high yield, is resistant to hydrolysis, and can readily be heat-decomposed to provide tetraisopropyl zirconate in substantially theoretical yield, this complex is relatively unstable, rapidly losing the first of its two molecules of ammonia when exposed to the atmosphere and breaking down physically to extremely small particles. The large surface area of these particles then facilitates relatively rapid hydrolysis of the material exposed to the atmosphere. Furthermore, this complex is only slightly soluble at room temperature in solvents such as alcohols. The complex containing only one mole of ammonia for each mole of zirconium (a "monoammoniate"), on the other hand, possesses the advantage not only of providing a high yield of tetraisopropyl zirconate, but is itself relatively stable so far as loss of ammonia is concerned and undergoes little or no physical disintegration upon exposure to the atmosphere at room temperature. Consequently, this monoammoniate is much less susceptible to hydrolysis than the diammoniate and is also very much less susceptible to hydrolysis than is the alcohol complex referred to above. As a consequence of its stability, it may be weighed on a conventional balance without any special precautions with a high degree of accuracy, in contrast to the special precautions required with the alcoholate. It is very stable when stored in closed containers at temperatures below 0° C., no apparent change in composition occurring even after periods of several weeks. This complex is therefore the material of choice.

When stored in closed containers at temperatures from 0° to +10° C., the complex described above slowly loses a fraction of its ammonia content. When the ammonia content reaches 0.8 mole per mole of zirconate, however, the complex remains stable in storage under these conditions.

Storage at room temperature protected from the atmosphere in a closed container leads to further loss of ammonia, the complex at this temperature apparently being stable when it has an ammonia content of 0.5 mole per mole of zirconate. Complexes containing from 0.5 to 1.0 mole of ammonia per mole of zirconate are preferred for most purposes.

The following specific examples will serve to illustrate the nature of the invention more clearly without acting as a limitation upon the scope thereof.

Example 1

There was introduced into a carefully dried flask provided with a condenser 169 g. of anhydrous zirconium tetrachloride and 1500 ml. of anhydrous isopropanol, taking careful precautions to avoid contact of either of the reagents with the atmosphere in order to prevent possible hydrolysis. The flask was protected from the atmosphere with an absorption tube containing calcium hydride. The excess alcohol above the four moles required for each mole of zirconium tetrachloride served as a solvent and diluent. After standing overnight at room temperature, dry ammonia was bubbled into the reaction mixture at the rate of 1½ to 2½ liters per minute while stirring mechanically, leading to the precipitation of ammonium chloride. Introduction of ammonia was continued until the system was alkaline to litmus. The solid precipitate of ammonium chloride was removed by filtration and the filtrate was cooled to a temperature of −10° to −20° C. while introducing additional dry ammonia. Large colorless crystals soon appeared which could readily be separated by fitration. The crystals, which upon analysis by weight loss were found to contain 9.1% ammonia (calculated 9.4% ammonia for the diammoniate), had the formula

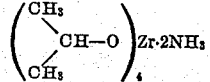

The yield amounted to 70% of the theoretical based on the weight of the zirconium tetrachloride.

The crystals of the diammoniate were found to be effluorescent in air, rapidly falling apart to a powder which then quickly hydrolyzed in contact with the atmosphere. Tetraisopropyl zirconate of high purity could readily be obtained simply by heating the crystals at reduced pressure at a tempreature of 110°–120° C. The tetraisopropyl zirconate thus produced was of very high purity, as shown by the fact that when distilled at reduced pressure it left substantially no residue.

*Example 2*

A mixture of 169 g. of anhydrous zirconium tetrachloride with 1½ liters of anhydrous isopropyl alcohol was placed in a flask provided with a condenser, both flask and condenser being carefully dried, and provided with an absorption tube containing calcium hydride to ensure protection of the reaction mixture from atmospheric moisture. After standing overnight, dry ammonia was introduced into the flask at the rate of 1½ to 2½ liters per minute while heating the mixture at reflux temperature (82° C.) with constant stirring. The introduction of ammonia was continued for approximately five hours, during which time ammonium chloride precipitated.

The reaction mixture was then filtered to remove the ammonium chloride with precautions to avoid contact of the mixture with the atmosphere. Additional dry ammonia was then introduced into the filtrate while the latter was maintained at 40° C., the ammonia being introduced at the rate of 1½ to 2½ liters per minute for thirty minutes. After storage of the mixture at 0° C. overnight, large colorless crystals formed which could readily be separated by filtration, and additional crystals were obtained by evaporating off the solvent while introducing further ammonia followed by cooling. The crystals were analyzed and found to have the following composition: Zr=27.00%, NH$_3$=4.91%, tetraisopropoxy =68.8%; calculated for

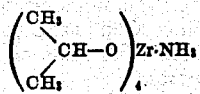

Zr=26.5%, NH$_3$=4.95%, tetraisopropoxy=68.6%.

The crystals could be exposed to the atmosphere for as much as 20 to 25 minutes at room temperature before exhibiting any evidence of substantial hydrolysis. Analysis of a sample of the product after storage in a closed bottle at −10° to 0° C. for a period of several days showed no change in composition. A second sample stored in a closed bottle at 0° to +10° C. lost a substantial portion of its ammonia content overnight, the ammonia content then being determined to be 4.10%. After a month's further storage under the same conditions, no further change in composition occurred, indicating that under these conditions the ammoniate containing approximately 0.8 mole of ammonia per mole of zirconate is stable.

Another sample was stored in a closed bottle at room temperature overnight, whereupon the ammonia content was found to have dropped to 2.5%. Further storage under the same conditions for a period of a month produced no further change in composition. The form of ammoniate stable under these conditions therefore contains about 0.5 mole of ammonia per mole of zirconate.

*Example 3*

A sample of the complex prepared in Example 2 containing one mole of ammonia per mole of zirconate was placed in a flask and the flask was evacuated to a pressure of 1 to 2 mm. The flask was then placed in a heating bath maintained at a temperature of 120° C., whereupon rapid evolution of ammonia from the sample occurred. After three minutes no further gas was evolved, and the product was in the form of a clear limpid liquid which upon analysis showed a zirconium content of 28.02% (calculated for tetraisopropyl zirconate, 27.84%). The liquid tetraisopropyl zirconate thus prepared could be distilled substantially completely, leaving almost no residue. This is in striking contrast to the behavior of tetraisopropyl zirconate prepared by other methods which leaves a large residue upon distillation.

Although specific embodiments of the invention have been described herein, it is not intended to limit the invention solely thereto, but to include all of the obvious variations and modifications within the spirit and scope of the appended claims.

What is claimed is:

1. A complex of tetraisopropyl zirconate with ammonia in which the mole ratio of ammonia to zirconate is up to 2:1.

2. A complex of tetraisopropyl zirconate with ammonia in which the mole ratio of ammonia to zirconate is up to 1:1.

3. A complex of tetraisopropyl zirconate with ammonia in which the mole ratio of ammonia to zirconate is from 0.5:1 to 1:1.

4. A complex of tetraisopropyl zirconate with ammonia in which the mole ratio of ammonia to zirconate is 1:1.

References Cited in the file of this patent

Bradley et al., J. Chem. Soc. (London) pages 280–285 (1951).